US008248649B2

(12) United States Patent
Akiyama et al.

(10) Patent No.: US 8,248,649 B2
(45) Date of Patent: Aug. 21, 2012

(54) INFORMATION PROCESSING APPARATUS AND COMPUTER-READABLE MEDIUM

(75) Inventors: Fumihito Akiyama, Yokohama (JP); Yoshinori Tanaka, Koganei (JP); Masahiro Ozawa, Hino (JP); Jun Kuroki, Sagamihara (JP); Hiroshi Nogawa, Hachioji (JP); Yasufumi Aoyama, Hachioji (JP); Kunikazu Sato, Chofu (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 627 days.

(21) Appl. No.: 12/407,197

(22) Filed: Mar. 19, 2009

(65) Prior Publication Data

US 2009/0316209 A1 Dec. 24, 2009

(30) Foreign Application Priority Data

Jun. 18, 2008 (JP) ................................. 2008-159011

(51) Int. Cl.
*G06K 15/00* (2006.01)

(52) U.S. Cl. ................. 358/1.16; 358/1.15; 358/426.01; 379/224; 382/232

(58) Field of Classification Search ................ 358/1.15, 358/1.16, 426.01, 444, 448; 709/247, 218, 709/224, 227; 382/232
See application file for complete search history.

(56) References Cited

U.S. PATENT DOCUMENTS

| | | | | |
|---|---|---|---|---|
| 6,028,676 A * | 2/2000 | Nakao | ......................... | 358/1.16 |
| 6,501,901 B2 * | 12/2002 | Yasuda et al. | ................. | 386/283 |
| 6,816,279 B1 * | 11/2004 | Izumi et al. | .................. | 358/1.16 |
| 7,167,269 B2 * | 1/2007 | Wu et al. | ...................... | 358/1.18 |
| 7,307,749 B2 * | 12/2007 | Nishikawa et al. | .......... | 358/1.15 |
| 7,480,069 B2 * | 1/2009 | Yoshida et al. | ............... | 358/1.16 |
| 7,593,424 B2 * | 9/2009 | Yamane et al. | ............... | 370/464 |
| 7,679,765 B2 * | 3/2010 | Uchikawa | .................... | 358/1.15 |
| 7,721,971 B2 * | 5/2010 | Yano | ............................. | 235/494 |
| 7,864,376 B2 * | 1/2011 | Okamoto et al. | ............. | 358/403 |
| 7,895,292 B2 * | 2/2011 | Yanagi et al. | .................. | 709/218 |
| 7,973,951 B2 * | 7/2011 | Nakajima | .................... | 358/1.13 |
| 8,134,730 B2 * | 3/2012 | Higashiura | ................... | 358/1.15 |
| 2002/0106186 A1 * | 8/2002 | Yasuda et al. | ................... | 386/52 |
| 2006/0005260 A1 * | 1/2006 | Haruki et al. | .................... | 726/27 |
| 2008/0040642 A1 * | 2/2008 | Furukawa et al. | ............ | 714/746 |
| 2008/0043278 A1 * | 2/2008 | Suzuki | .......................... | 358/1.15 |
| 2009/0116065 A1 * | 5/2009 | Okamoto | ..................... | 358/1.15 |

FOREIGN PATENT DOCUMENTS

JP 9-223061 8/1997

(Continued)

OTHER PUBLICATIONS

Japanese Questioning dated Apr. 26, 2011, which issued in Japanese Patent Application No. 2008-159011, along with English Translation (9 pages).

(Continued)

*Primary Examiner* — Negussie Worku

(74) *Attorney, Agent, or Firm* — Finnegan, Henderson, Farabow, Garrett & Dunner, L.L.P.

(57) ABSTRACT

Disclosed is an information processing apparatus comprising: a storage section to store data; and a control section to detect whether a data access to the storage section exists or not, to detect whether unnecessary data stored in the storage section exists or not, and to overwrite/delete the unnecessary data in a case where the data access does not exist and the unnecessary data exists.

12 Claims, 15 Drawing Sheets

| FOREIGN PATENT DOCUMENTS | | |
|---|---|---|
| JP | 9-284572 | 10/1997 |
| JP | 2001-159961 A | 6/2001 |
| JP | 2001-225514 A | 8/2001 |
| JP | 2005-149254 | 6/2005 |
| JP | 2005-182782 | 7/2005 |
| JP | 2005-313568 | 11/2005 |
| JP | 2006-59179 | 3/2006 |
| JP | 2008-42805 | 2/2008 |

OTHER PUBLICATIONS

Japanese Office Action for Japanese Priority Application No. 2008-159011 dated Apr. 27, 2010.
Japanese Office Action for Japanese Priority Application No. 2008-159011 dated Aug. 10, 2010.

\* cited by examiner

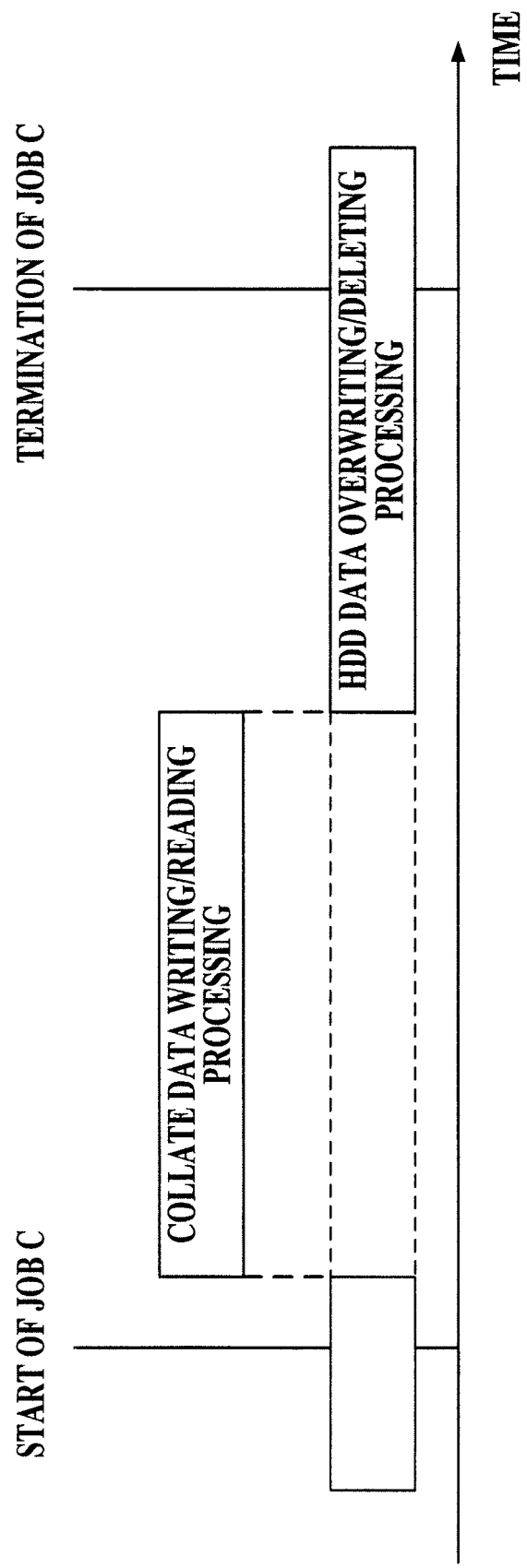

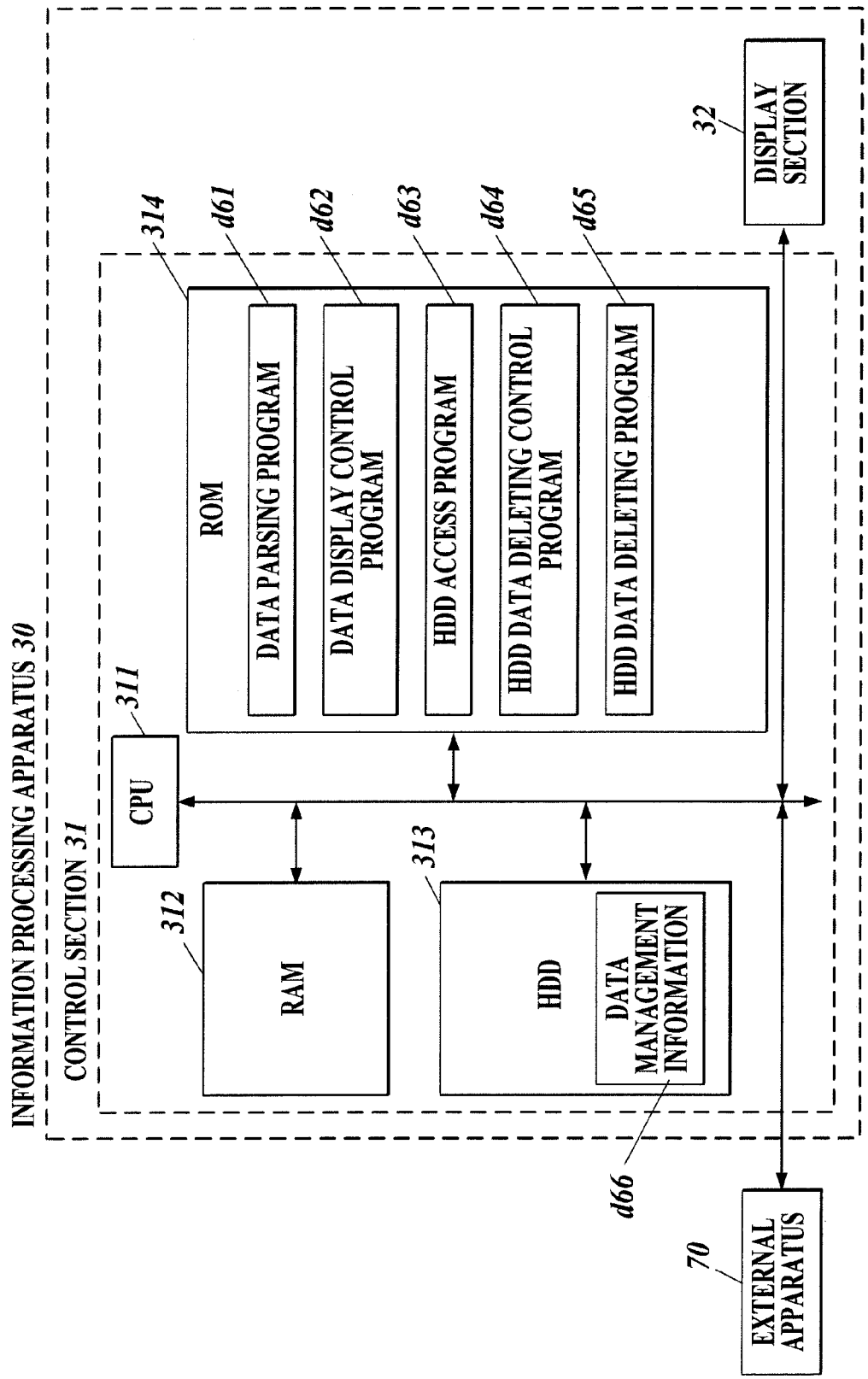

INFORMATION PROCESSING APPARATUS AND COMPUTER-READABLE MEDIUM

BACKGROUND OF THE INVENTION

1. Field of the Invention

The present invention relates to an information processing apparatus, and a computer-readable medium.

2. Description of Related Art

In a case where data (for example, a file which has been made) written onto a hard disk drive (HDD) which is comprised by an image forming apparatus such as a multifunction peripheral (MFP), and the like, is to be deleted, it has been required that not only the link to the data (which is the data to be deleted, or the unnecessary data) be eliminated, that is to say, the data should be invalidated, but also an overwriting/deleting be performed, in which irrelevant data (random data) is overwritten in a storage region of the HDD where the data to be deleted is stored, based on the perspective of an information security.

However, in an image forming apparatus, when image forming processing based on a print job is executed while overwriting/deleting processing of the data to be deleted (HDD data overwriting/deleting processing) is being executed, data accesses to the HDD are concentrated, thus may likely to cause a decrease of the processing speed of the image forming processing.

In order to solve the above described problem, Japanese Patent Application Laid Open Publication No. 2005-149254 discloses a technique in which a print control apparatus (image forming apparatus) is provided with a function to let a user set the execution timing of the HDD data overwriting/deleting (such as a deleting execution time and date, an access time, and the like), and the deleting range, so as to prevent the HDD data overwriting/deleting processing from overlapping the image forming processing based on a print job, thus to prevent the decrease of the processing speed.

Further, Japanese Patent Application Laid Open Publication No. 9-284572 discloses a technique of an image processing apparatus in which an input of a deleting cancel request for image data is received when copying is requested, and overwriting/deleting processing is performed for a region in which image data with no deleting cancel request is stored, while an idling time after the copy processing is terminated.

Further, Japanese Patent Application Laid Open Publication No. 2008-42805 discloses a technique of an image processing apparatus in which when the printing of image data is terminated, the management information regarding the image data which has been subjected to the printing is relocated to a deleted region, so as to invalidate (overwrite/delete) the image data while the idling time.

However, the technique disclosed in Japanese Patent Application Laid Open Publication No. 2005-149254 lacked the convenience for a user in that the user was required to set the execution conditions of the HDD overwriting/deleting processing to prevent the decrease of the processing speed (such as the deleting execution time, and the like). Further, in a case where the image forming processing based on a print job is executed at the same time as the set deleting execution time, there was a possibility of the processing speed of the image forming processing being decreased.

Further, according to the techniques disclosed in Japanese Patent Application Laid Open Publications Nos. 9-284572 and 2008-42805, the HDD data overwriting/deleting processing cannot be executed while the job is being executed in the image forming apparatus at all times. Thus, although there is a period in which the HDD is not accessed, the HDD data overwriting/deleting processing is not performed during this period, while the job is being executed. This results in inefficiency due to the unproductive waiting for the processing.

SUMMARY OF THE INVENTION

The present invention was made in order to settle the above problems. It is one of the objects of the present invention to provide an information processing apparatus with convenience, in which an overwriting/deleting of unnecessary data can be performed with efficiency.

To achieve at least one of the above objects, an information processing apparatus reflecting one aspect of the present invention, comprises:

a storage section to store data; and a control section to detect whether a data access to the storage section exists or not, to detect whether unnecessary data stored in the storage section exists or not, and to overwrite/delete the unnecessary data in a case where the data access does not exist and the unnecessary data exists.

Preferably, the control section manages information pertaining to whether the data stored in the storage section is valid or invalid, and the unnecessary data is data to be deleted, the data being invalidated by the control section.

Preferably, the control section holds data management information to manage the information pertaining to whether the data stored in the storage section is valid or invalid, based on the data management information.

Preferably, the control section comprises at least one functional unit to perform data processing, and wherein the control section detects whether the data access to the storage section by the at least one functional unit exists or not.

Preferably, the information processing apparatus is an image forming apparatus to perform image forming processing based on a print job.

Preferably, the control section comprises at least one functional unit to perform the image forming processing.

Preferably, the number of the functional units is two or more, and one of the functional units comprised by the control section is a data parsing unit to obtain print data and to parse the obtained print data.

Preferably, one of the functional units comprised by the control section is a data rendering unit to generate rendering data based on the print data parsed by the data parsing unit.

Preferably, one of the functional units comprised by the control section is an image forming control unit to control the image forming processing of forming an image based on the rendering data generated by the data rendering unit.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein;

FIG. 9 is an operational example of the image forming apparatus when the collate printing job is executed;

FIG. 11 is a block diagram of an information processing apparatus;

DETAILED DESCRIPTION OF THE PREFERRED EMBODIMENTS

[First Embodiment]

Hereinbelow, a first embodiment of an information processing apparatus according to the present invention is described with reference to the drawings. In the present embodiment, the present invention is applied to an image forming apparatus as an information processing apparatus.

[System Configuration of an Image Forming System]

Figure 1:
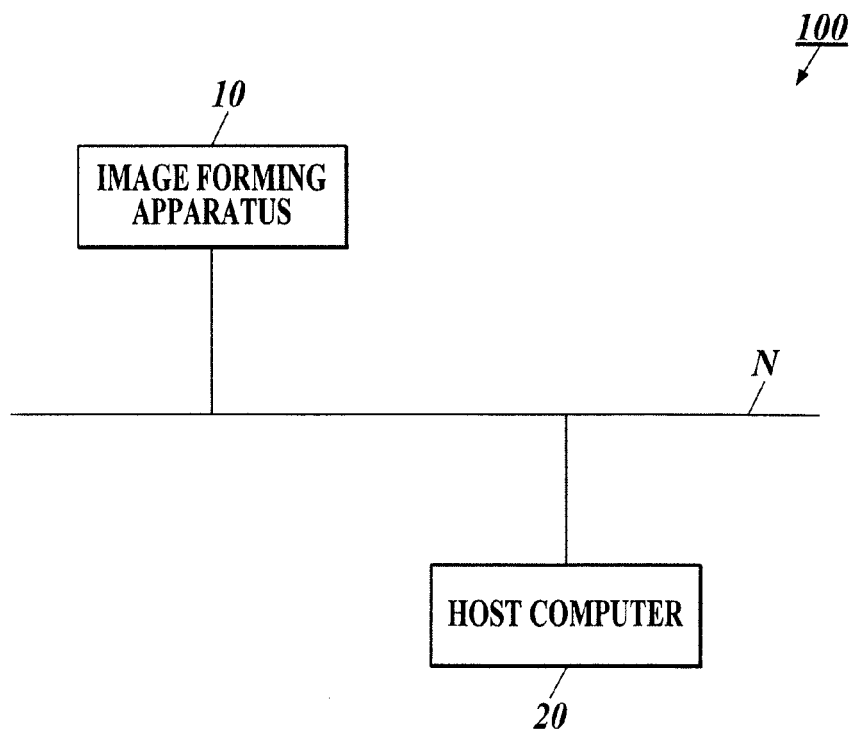
FIG. 1 is a system configuration diagram of an image forming system.

FIG. 1 shows a system configuration of an image forming system 100. As shown in FIG. 1, the image forming system 100 comprises an image forming apparatus 10 and a host computer 20, and each of the apparatuses are connected so as to be capable of performing data communication through a communication network N such as local area network (LAN), and the like.

The image forming apparatus 10 is what is called a multi-function peripheral (MFP) which comprises a copying function, an image reading function, and a printer function. The image forming apparatus 10 forms an image on a sheet based on a print job (a print instruction) transmitted from the host computer 20, or on image data read by an image reading section of a scanner and the like, comprised by the image forming apparatus 10, and the like.

The host computer 20 is what is called a personal computer, and comprises a function of transmitting the print job to the image forming apparatus 10. A printer driver program (which hereinbelow may simply be referred to as a printer driver) is installed in the host computer 20, and the host computer 20 generates a print job including data (print job information) of a printing condition which is to be applied when an image is formed, image data, and the like, by using the function of the printer driver, so as to transmit the generated print job to the image forming apparatus 10.

[Apparatus Configuration of the Image Forming Apparatus]

Figure 2:
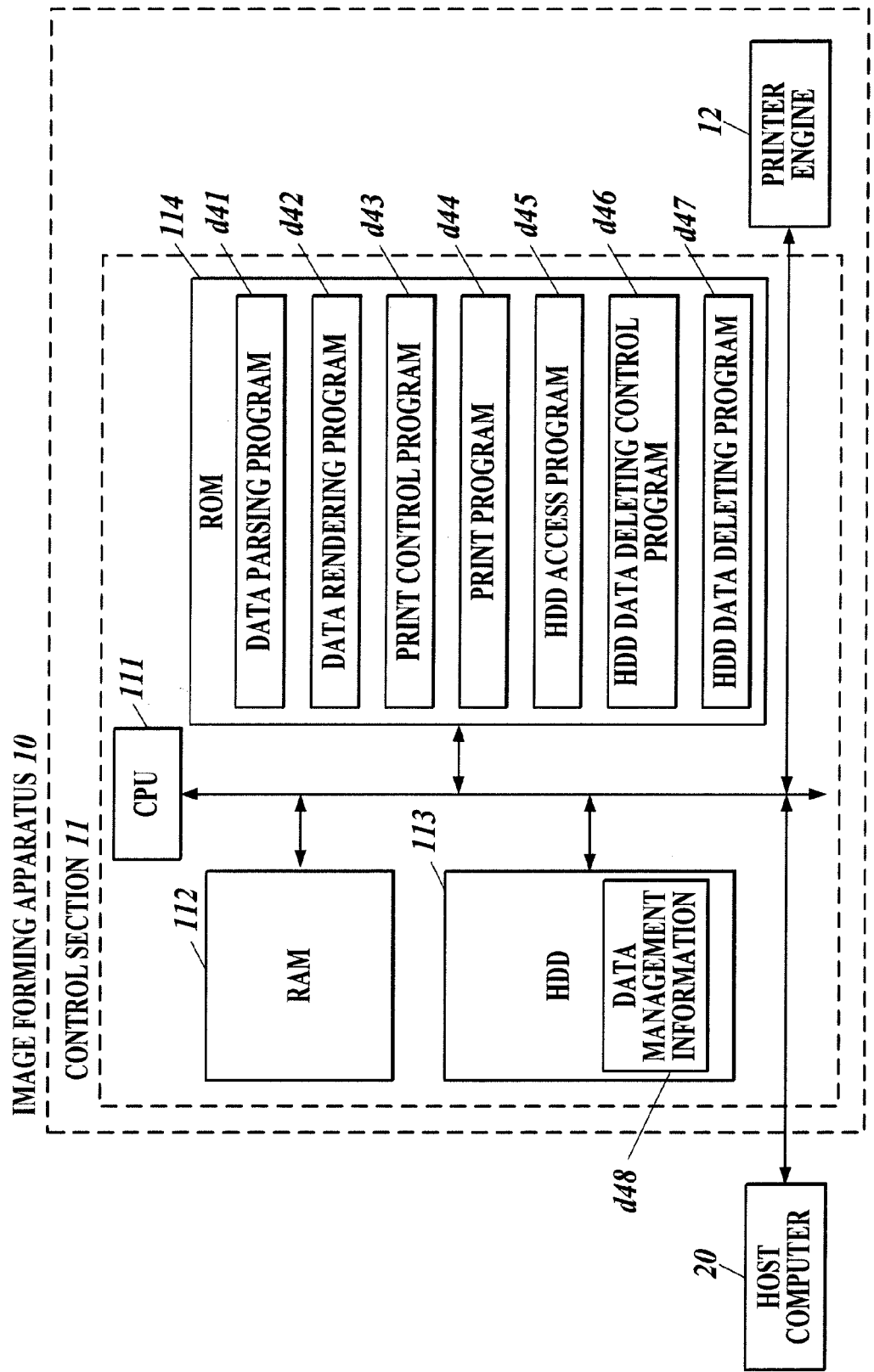
FIG. 2 is a block diagram of an image forming apparatus.

FIG. 2 shows an apparatus configuration of the image forming apparatus 10. As shown in FIG. 2, the image forming apparatus 10 comprises a control section 11, a printer engine 12, and the like.

The printer engine 12 is a functional section to form an image, and comprises a photo conductor, a transfer belt, a fixing device, various conveying belts, and the like. The printer engine 12 forms an image on a printing sheet supplied from a feeding section (not shown), based on image data read by an image reading section (not shown) or on a print job received through a communication section (not shown), so as to send the formed image to an image output section (not shown). As a forming method of the image, a known image producing process, such as an electrophotographic method, an electrostatic recording method, and the like, is applied.

Here, the feeding section is a functional section to house sheets (printing sheets), and sends out (supplies) the housed printing sheets to the printer engine 12. Further, the image reading section is a functional section to optically read an image of a document on a platen so as to generate image data. Further, the image output section is a functional section to add finishing processing such as a punching, a stapling, a book binding, and the like, for the sheets conveyed from the printer engine 12 so as to output the sheets. Further, the communication section is a functional section which comprises a LAN interface, a modem, and the like, and performs data communication with an external device such as the host computer 20, and the like, through the communication network N, and the like.

The control section 11 controls the printer engine 12 and the like. The control section 11 is connected to the printer engine 12 through a bus, and is connected to the host computer 20 through the bus, the communication section and the communication network N so as to be capable of communication. Further, the control section 11 comprises a central processing unit (CPU) 111, a random access memory (RAM) 112, an HDD 113 and a ROM 114, each of which is connected to each other through the bus so as to be capable of communication.

The CPU 111 reads out various processing programs stored in the ROM 114, expands the read programs in a work area and the like formed in the RAM 112, and performs various processing in cooperation with the expanded programs. For example, the CPU 111 integrally manages and controls the image forming apparatus 10 by performing the control of operations of each of the functional sections, the control of input and output of data to and from each of the functional sections, and the like. Here, each of the functional sections is referred to specifically as the printer engine 12, the feeding section, the image reading section, the image output section, and the like.

The RAM 112 is a section to temporarily store various data read by the image reading section or input from the communication section. The stored image data is processed by the CPU 111, and is transferred to the HDD 113 and the printer engine 12 as necessary.

Further, the RAM 112 stores a print job. The print job comprises, for example, print job information which indicates a printing condition, and image data which indicates an image of the printing object. The image data comprises, for example, four colors of cyan (C), yellow (Y), magenta (M), and black (K). The CPU 111 receives the print job from another communication device (for example, the host computer 20) through the communication section. Incidentally, the image data may be information read by the image reading section, and the print job information may be information set by an input signal from an operation section (not shown) When the communication section receives the print job, the CPU 111 instructs the RAM 112 and/or the HDD 113 to store the print job. Incidentally, the print job may comprise the image of the printing object in a file format, for example in a portable document format (PDF), an XML paper specification (XPS), and the like, instead of the image data.

The HDD 113 is a storage section to store various data. To put it concretely, the HDD 113 stores font data, the print job, collate data, and the like. Here, the print job which is stored in the HDD 113 may be referred to as saved job data. Further, the HDD 113 stores data management information d48 including information indicating whether various data stored in the HDD 113 is valid or invalid. The data management information d48 is updated by the CPU 111. Here, the invalid data means the data to be deleted which is an object of the overwriting/deleting.

The ROM 114 stores programs so that the CPU 111 can control each of the functional units, information pertaining to processing functions of the image forming apparatus 10, and the like, which are read out by the CPU 111 as necessary so as to be subjected to execution processing in the RAM 112. To put it concretely, the ROM 114 stores a data parsing program d41, a data rendering program d42, a print control program d43, a print program d44, an HDD access program d45, an HDD data deleting control program d46, an HDD data deleting program d47, and the like.

The CPU 111 reads out the data parsing program d41 in the RAM 112 so as to function as a data parsing unit 41 in cooperation with the data parsing program d41. Further, the CPU 111 reads out the data rendering program d42 in the RAM 112 so as to function as a data rendering unit 42 in cooperation with the data rendering program d42. Further, the CPU 111 reads out the print control program d43 in the RAM 112 so as to function as a print control unit 43 in cooperation with the print control program d43. Further, the CPU 111 reads out the print program d44 in the RAM 112 so as to function as a print unit 44 in cooperation with the print program d44. Further, the CPU 111 reads out the HDD access program d45 in the RAM 112 so as to function as an HDD access unit 45 in cooperation with the HDD access program d45. Further, the CPU 111 reads out the HDD data deleting control program d46 in the RAM 112 so as to function as an HDD data deleting control unit 46 in cooperation with the HDD date deleting control program d46. Further, the CPU 111 reads out the HDD data deleting program d47 in the RAM 112 so as to function as an HDD data deleting unit 47 in cooperation with the HDD data deleting program d47.

Here, the data parsing unit 41 parses job data when the job data is received from an external device such as the host computer 20, and the like, through the communication section. Subsequently, the data parsing unit 41 stores the job data in the HDD 113, and outputs the job data to the data rendering unit 42, based on the results of the parsing. For example, when the data parsing unit 41 receives a print job from the host computer 20, the data parsing unit 41 parses the print job to output image data included in the print job to the data rendering unit 42. Further, the data parsing unit 41 outputs parsed information based on the parsing to each of the functional units which configures the control section 11.

The data rendering unit 42 generates rendering data such as bitmap data, and the like, based on the image data output from the data parsing unit 41 and image data included in the saved job data stored in the HDD 113. Subsequently, the data rendering unit 42 outputs the generated rending data to the print control unit 43.

The print control unit 43 controls image forming processing (print processing), based on the rendering data output from the data rendering unit 42, the parsed information output from the data parsing unit 41, and the like. For example, the print control unit 43 instructs the HDD 113 to store parsed information to execute a collate printing (a sort printing) and rendering data for the collate printing (collate data). Subsequently, the print control unit 43 reads out the collate data from the HDD 113 as necessary. Further, the print control unit 43 outputs the rendering data output from the data rendering unit 42 and the rendering data (for example, the collate data) read out from the HDD 113 to the print unit 44.

The print unit 44 outputs a control instruction to the printer engine 12, based on the parsed information output from the data parsing unit 41, and the like. Further, the print unit 44 outputs the rendering data output from the print control unit 43 to the printer engine 12. Subsequently, the printer engine 12 forms an image on printing sheets, based on the control instruction and the rendering data.

[Functional Configuration of the Image Forming Apparatus]

Figure 3:
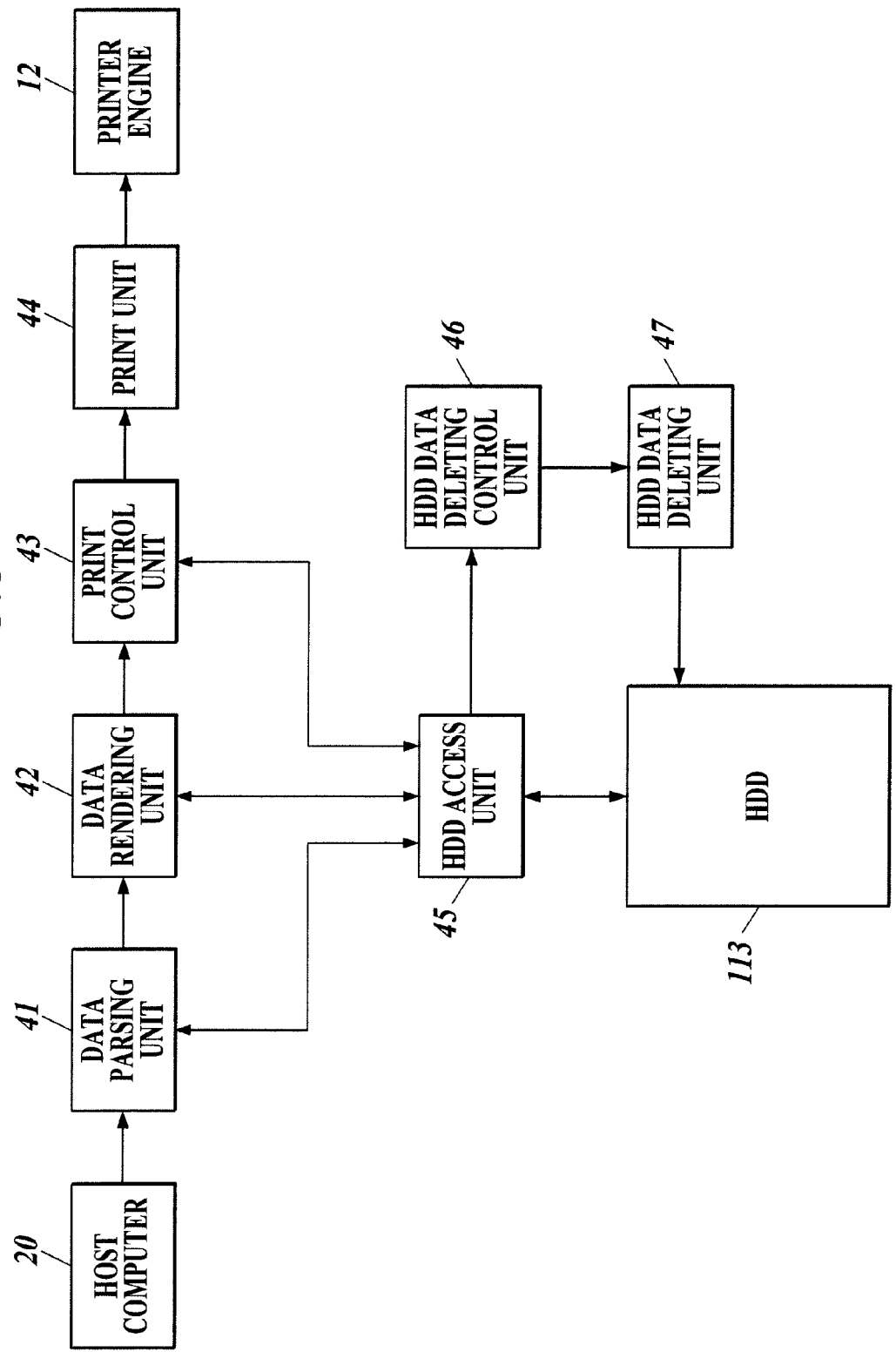
FIG. 3 is a functional configuration diagram of the image forming apparatus.

FIG. 3 shows a functional configuration of the image forming apparatus 10.

As shown in FIG. 3, the data parsing unit 41 receives job data from an external device such as the host computer 20, and the like, through the communication section which is not shown. Further, the data parsing unit 41 outputs data based on the job data to the data rendering unit 42. The data rendering unit 42 outputs data based on the job data to the print control unit 43. Further, the print control unit 43 outputs data based on the job data to the print unit 44. Further, the print unit 44 outputs data based on the job data to the printer engine 12.

For example, when the data parsing unit 41 receives a print job which is one kind of job data from the host computer 20 through the communication section, the data parsing unit 41 parses the print job to output image data included in the print job to the data rendering unit 42. Subsequently, the data rendering unit 42 generates rendering data such as bitmap data, and the like, based on the image data output from the data parsing unit 41 to output the generated rendering data to the print control unit 43. Subsequently, the print control unit 43 outputs the rendering data to the print unit 44. Subsequently, the print unit 44 outputs the rendering data to the printer engine 12.

Further, a data access from each of the functional units to the HDD 113 is performed through the HDD access unit 45. To put it concretely, the data parsing unit 41, the data rendering unit 42, and the print control unit 43 perform the data access to the HDD 113 through the HDD access unit 45.

The HDD data deleting control unit 46 outputs an execution instruction of HDD data overwriting/deleting processing, and a suspension instruction of the HDD data overwriting/deleting processing to the HDD data deleting unit 47, so as to control the data overwriting/deleting processing (the HDD data overwriting/deleting processing) of the HDD 113 by the HDD data deleting unit 47.

Here, the HDD data deleting control unit 46 refers to the data management information d48 stored in the HDD 113 to judge (detect) whether the data to be deleted (the unnecessary data) which is to be the object of the HDD data overwriting/deleting processing is stored in the HDD 113 or not. Further, the HDD data deleting control unit 46 detects the existence or nonexistence of the data access to the HDD 113, based on an HDD access execution state notification which is output from any one of the data parsing unit 41, the data rendering unit 42, and the print control unit 43 through the HDD access unit 45. Incidentally, this may be configured so that any one of the data parsing unit 41, the data rendering unit 42, and the print control unit 43 outputs the HDD access execution state notification directly to the HDD data deleting control unit 46, without the HDD access unit 45 in between.

Subsequently, in a case where there is no data access to the HDD 113 and the data to be deleted is stored in the HDD 113, the HDD data deleting control unit 46 instructs the HDD data deleting unit 47 to execute the HDD data overwriting/deleting processing. Further, in a case where there is a data access to the HDD 113 or in a case where the data to be deleted is not stored in the HDD 113, the HDD data deleting control unit 46 instructs the HDD data deleting unit 47 not to execute the HDD data overwriting/deleting processing (so as to be suspended or canceled).

To put it concretely, when the data to be deleted is stored in the HDD 113, the HDD data deleting control unit 46 outputs an execution instruction of the HDD data overwriting/deleting processing to the HDD data deleting unit 47, so as to instruct the HDD data deleting unit 47 to execute the HDD data overwriting/deleting processing. Subsequently, the HDD data deleting control unit 46 outputs the suspension instruction of the HDD data overwriting/deleting processing to the HDD data deleting unit 47, based on the HDD access execution state notification indicating an access start (when the HDD access execution state notification is received), so as to instruct the HDD data deleting unit 47 to suspend the HDD data overwriting/deleting processing. Subsequently, the HDD data deleting control unit 46 outputs the execution instruction of the HDD data overwriting/deleting processing to the HDD data deleting unit 47, based on the HDD access execution state notification indicating an access termination (when the HDD access execution state notification is received), so as to instruct the HDD data deleting unit 47 to resume the HDD data overwriting/deleting processing.

The HDD data deleting unit 47 starts the execution of the HDD data overwriting/deleting processing for the HDD 113 based on the execution instruction from the HDD data deleting control unit 46, and suspends the execution of the HDD data overwriting/deleting processing for the HDD 113 based on the suspension instruction.

[HDD Access from the Data Parsing Unit]

Next the processing in the image forming apparatus 10 when a job of downloading font data is executed will be described with reference to FIGS. 4 and 5.

Figure 4:
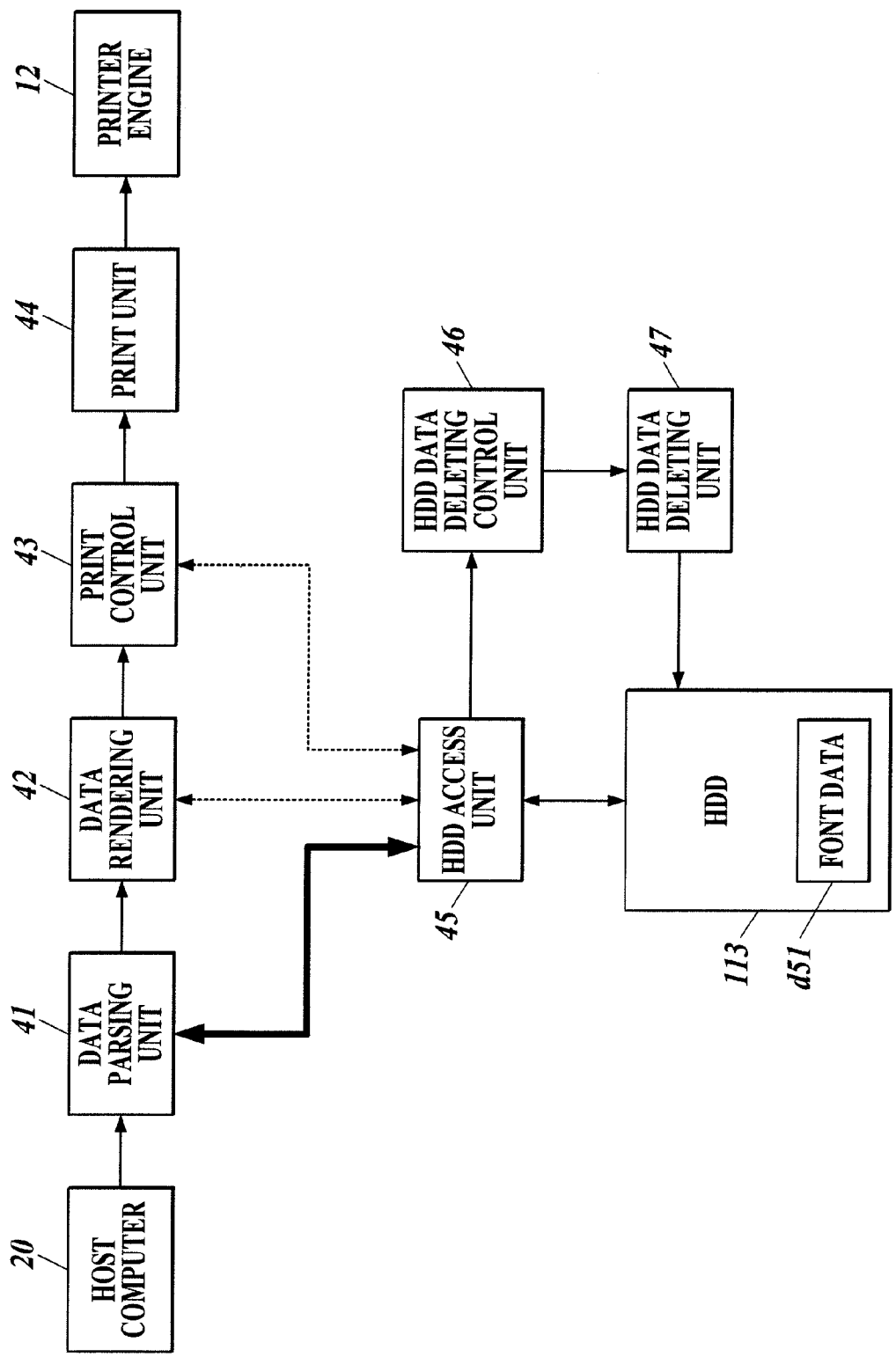
FIG. 4 is a functional configuration diagram of the image forming apparatus when a job of downloading font data is executed.

FIG. 4 is a functional configuration diagram of the image forming apparatus 10 when a job of downloading font data is executed. As shown in FIG. 4, the data parsing unit 41 receives job data including an HDD access command for the data parsing unit 41, and font data d51, from the host computer 20 through the communication section. Subsequently, the data parsing unit 41 parses the received job data, and judges whether the job based on the job data (hereinbelow referred to as a job A) is a job which includes an instruction for the data parsing unit 41 to perform a data access to the HDD 113. Subsequently, the data parsing unit 41 executes the job A.

Subsequently, the data parsing unit 41 starts the execution of font data writing processing based on the HDD access command, and instructs the HDD 113 to write (store) the font data d51 therein through the HDD access unit 45, in the job A. On this occasion, the data parsing unit 41 outputs the HDD access execution state notification (the access start) to the HDD data deleting control unit 46.

Subsequently, the data parsing unit 41 terminates the execution of the font data writing processing based on the HDD access command, in the job A. That is to say, the data parsing unit 41 terminates the writing of the font data to the HDD 113. On this occasion, the data parsing unit 41 outputs the HDD access execution state notification (the access termination) to the HDD data deleting control unit 46. Subsequently, the data parsing unit 41 terminates job A.

On the other hand, the HDD data deleting control unit 46 judges whether the data which is to be an object of the HDD data overwriting/deleting processing (the data to be deleted) exists in the HDD 113 or not, and in a case where the data to be the object exists, the HDD data deleting control unit 46 instructs the HDD data deleting unit 47 to execute the HDD data overwriting/deleting processing. Further, when the HDD access execution state notification (the access start) is input from the data parsing unit 41, the HDD data deleting control unit 46 outputs the suspension instruction of the HDD data overwriting/deleting processing to the HDD data deleting unit 47, so as to instruct the HDD data deleting unit 47 to suspend the HDD data overwriting/deleting processing. Subsequently, when the HDD access execution state notification (the access termination) is input from the data parsing unit 41, the HDD data deleting control unit 46 outputs the execution instruction of the HDD data overwriting/deleting processing to the HDD data deleting unit 47, so as to instruct the HDD data deleting unit 47 to resume the HDD data overwriting/deleting processing.

Figure 5:
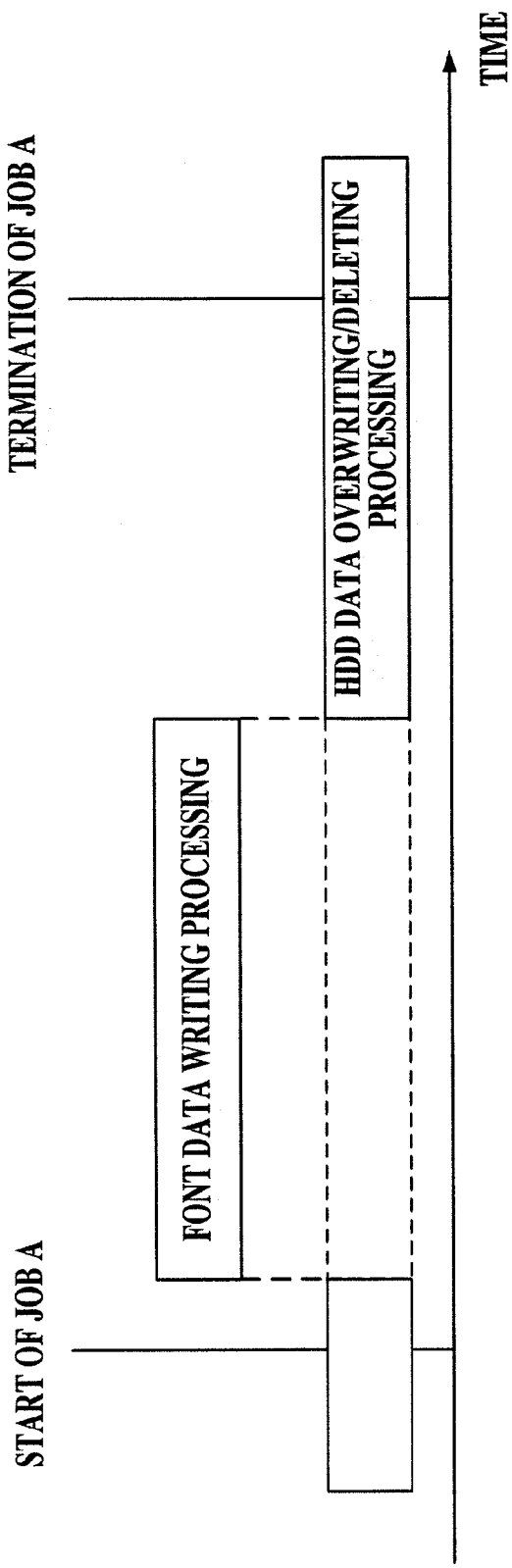
FIG. 5 is an operational example of the image forming apparatus when the job of downloading the font data is executed.

That is to say, as shown in FIG. 5, when the job A is started, and when the execution of "the font data writing processing" based on the HDD access command in the job A is started (or before the execution starts), the HDD data overwriting/deleting processing is suspended. Subsequently, when the font data writing processing in the job A is terminated, the HDD data overwriting/deleting processing is resumed. Thus, the HDD data overwriting/deleting processing is performed even while the job A is being executed, which results in efficiency.

[HDD Access from the Data Rendering Unit]

Next, the processing in the image forming apparatus 10 when the saved job which is saved in the HDD 113 is executed will be described with reference to FIGS. 6 and 7.

Figure 6:
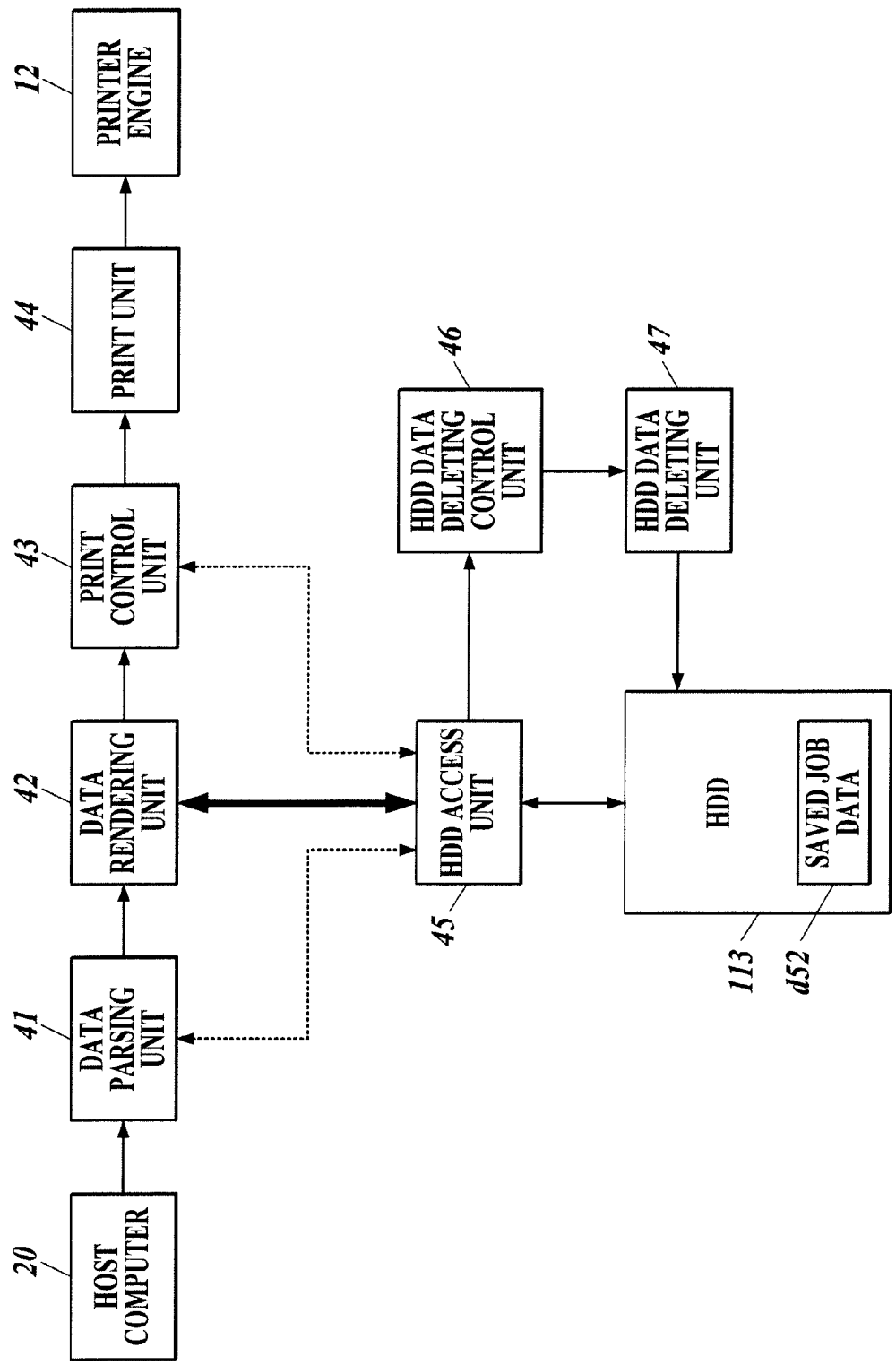
FIG. 6 is a functional configuration diagram of the image forming apparatus when a saved job which is saved in an HDD is executed.

FIG. 6 is a functional configuration diagram of the image forming apparatus 10 when a saved job which is saved in the HDD 113 is executed. As shown in FIG. 6, the data parsing unit 41 receives a print job including an HDD access command for the data rendering unit 42, from the host computer 20 through the communication section. Subsequently, the data parsing unit 41 parses the received print job, and instructs the HDD 113 to write (store) the print job therein as saved job data d52 through the HDD access unit 45. Subsequently, the data parsing unit 41 outputs (notifies) a saved job execution instruction including the HDD access command for the data rendering unit 42 to the data rendering unit 42.

The data rendering unit 42 starts a job based on the saved job execution instruction (hereinbelow referred to as a job B). Subsequently, the data rendering unit 42 starts the execution of saved job data reading processing based on the HDD access command, so as to read out the saved job data d52 from the HDD 113 through the HDD access unit 45, in the job B. On this occasion, the data rendering unit 42 outputs the HDD access execution state notification (the access start) to the HDD data deleting control unit 46.

Subsequently, the data rendering unit 42 terminates the execution of the saved job data reading processing based on the HDD access command, in the job B. That is to say, the data rendering unit 42 terminates the reading out of the saved job data from the HDD 113. On this occasion, the data rendering unit 42 outputs the HDD access execution state notification (the access termination) to the HDD data deleting control unit 46. Subsequently, the data rendering unit 42 generates rendering data based on the read out saved job data, and the like, and terminates the job B.

On the other hand, the HDD data deleting control unit 46 judges whether the data which is to be an object of the HDD data overwriting/deleting processing (the data to be deleted) exists in the HDD 113 or not, and in a case where the data to be the object exists, the HDD data deleting control unit 46 instructs the HDD data deleting unit 47 to execute the HDD data overwriting/deleting processing. Further, when the HDD access execution state notification (the access start) is input from the data rendering unit 42, the HDD data deleting control unit 46 outputs the suspension instruction of the HDD data overwriting/deleting processing to the HDD data deleting unit 47, so as to instruct the HDD data deleting unit 47 to suspend the HDD data overwriting/deleting processing. Subsequently, when the HDD access execution state notification (the access termination) is input from the data rendering unit 42, the HDD data deleting control unit 46 outputs the execution instruction of the HDD data overwriting/deleting processing to the HDD data deleting unit 47, so as to instruct the HDD data deleting unit 47 to resume the HDD data overwriting/deleting processing.

Figure 7:
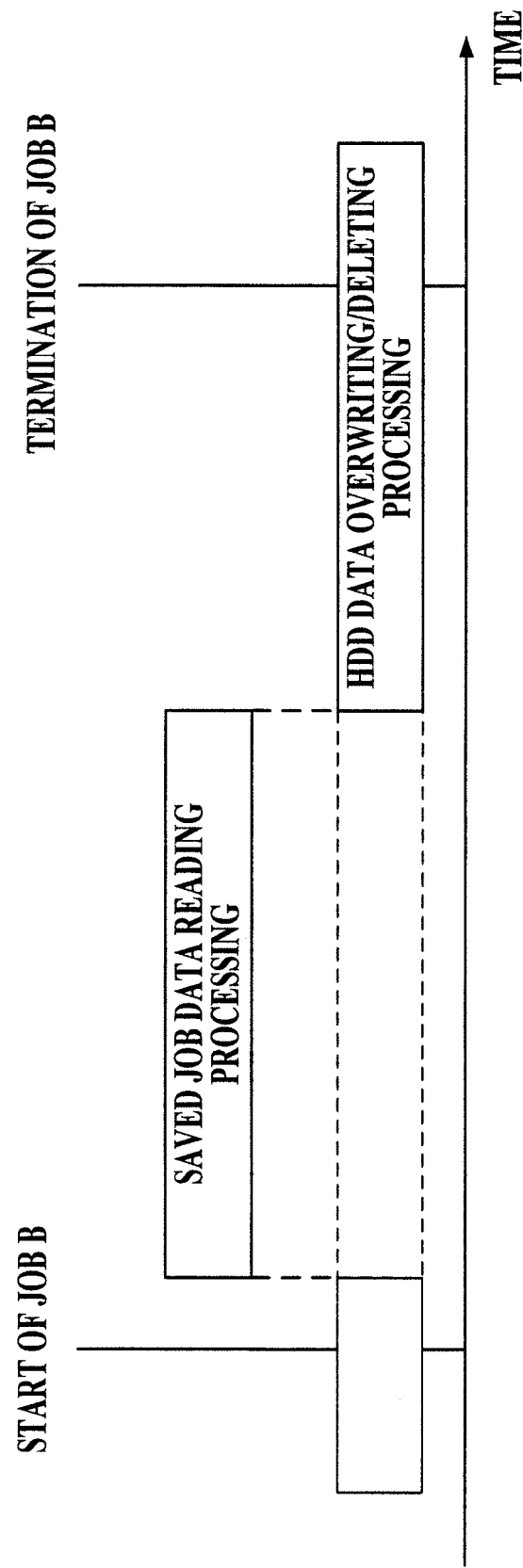
FIG. 7 is an operational example of the image forming apparatus when the saved job which is saved in the HDD is executed.

That is to say, as shown in FIG. 7, when the job B is started, and when the execution of "the saved job data reading processing" based on the HDD access command in the job B is started (or before the execution starts), the HDD data overwriting/deleting processing is suspended. Subsequently, when the saved job data reading processing in the job B is terminated, the HDD data overwriting/deleting processing is resumed. Thus, the HDD data overwriting/deleting processing is performed even while the job B is being executed, which results in efficiency.

[HDD Access from the Print Control Unit]

Next, the processing in the image forming apparatus 10 when a collate printing job is executed will be described with reference to FIGS. 8 and 9.

Figure 8:
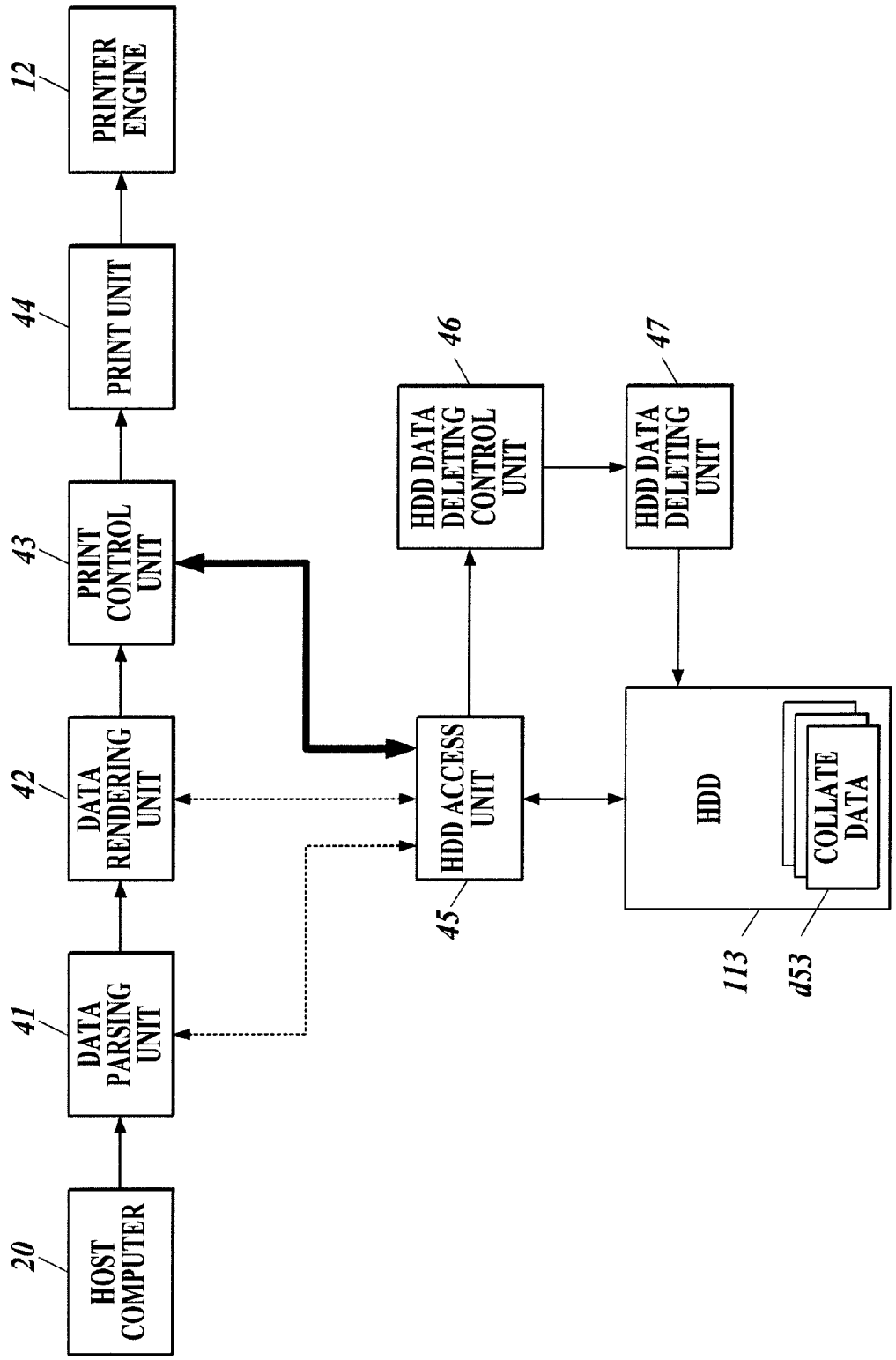
FIG. 8 is a functional configuration diagram of the image forming apparatus when a collate printing job is executed.

FIG. 8 is a functional configuration diagram of the image forming apparatus 10 when a collate printing job is executed. As shown in FIG. 8, the data parsing unit 41 receives a print job to perform a collate printing (a collate printing job) including an HDD access command for the print control unit 43, from the host computer 20 through the communication section. Subsequently, the data parsing unit 41 parses the received collate printing job, and outputs the image data included in the collate printing job to the data rendering unit 42. Further, the data parsing unit 41 outputs the parsed information based on the parsing to the data rendering unit 42 and to the print control unit 43. Here, this parsed information is information which includes an execution instruction of the collate printing. Further, the parsed information also includes the HDD access command for the print control unit 43.

The data rendering unit 42 generates rendering data which corresponds to the collate printing job, based on the image data and the parsed information output from the data parsing unit 41. Subsequently, the data rendering unit 42 outputs the generated rendering data to the print control unit 43.

The print control unit 43 starts a job based on the execution instruction of the collate printing (hereinbelow referred to as a job C), on the basis of the rendering data output from the data rendering unit 42 and of the parsed information output from the data parsing unit 41. Subsequently, the print control unit 43 starts the execution of collate data writing/reading processing based on the HDD access command, so as to write the collate data d53 onto the HDD 113 and read out the collate data d53 from the HDD 113 through the HDD access unit 45, in the job C. On this occasion, the print control unit 43 outputs the HDD access execution state notification (the access start) to the HDD data deleting control unit 46.

Subsequently, the print control unit 43 terminates the execution of the collate data writing/reading processing based on the HDD access command, in the job C. That is to say, the print control unit 43 terminates the writing of the collate data onto the HDD 113, and reading out of the collate data from the HDD 113. On this occasion, the print control unit 43 outputs the HDD access execution state notification (the access termination) to the HDD data deleting control unit 46. Subsequently, the print control unit 43 performs the output of the rendering data to the print unit 44, and the like, and terminates the job C.

On the other hand, the HDD data deleting control unit 46 judges whether the data which is to be an object of the HDD data overwriting/deleting processing (the data to be deleted) exists in the HDD 113 or not, and in a case where the data to be the object exists, the HDD data deleting control unit 46 instructs the HDD data deleting unit 47 to execute the HDD data overwriting/deleting processing. Further, when the HDD access execution state notification (the access start) is input from the print control unit 43, the HDD data deleting control unit 46 outputs the suspension instruction of the HDD data overwriting/deleting processing to the HDD data deleting unit 47, so as to instruct the HDD data deleting unit 47 to suspend the HDD data overwriting/deleting processing. Subsequently, when the HDD access execution state notification (the access termination) is input from the print control unit 43, the HDD data deleting control unit 46 outputs the execution instruction of the HDD data overwriting/deleting processing to the HDD data deleting unit 47, so as to instruct the HDD data deleting unit 47 to resume the HDD data overwriting/deleting processing.

That is to say, as shown in FIG. 9, when the job C is started, and when the execution of "the collate data writing/reading processing" based on the HDD access command in the job C is started (or before the execution starts), the HDD data overwriting/deleting processing is suspended. Subsequently, when the collate data writing/reading processing in the job C is terminated, the HDD data overwriting/deleting processing is resumed. Thus, the HDD data overwriting/deleting processing is performed even while the job C is being executed, which results in efficiency.

[Detailed Operation of the Image Forming Apparatus]

Figure 10A:
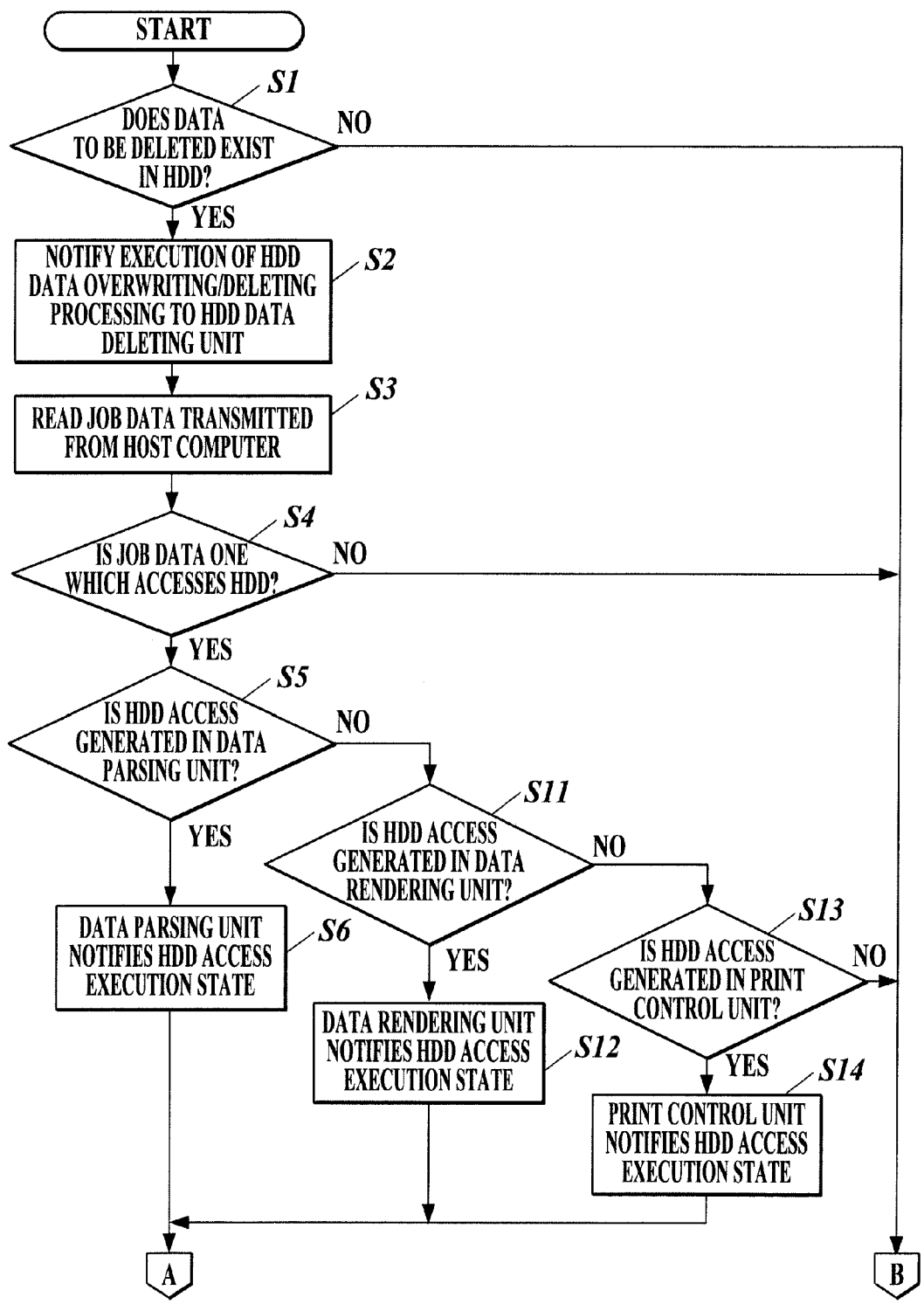
FIGS. 10A and 10B are flow charts showing processing executed in the image forming apparatus.
Figure 10B:
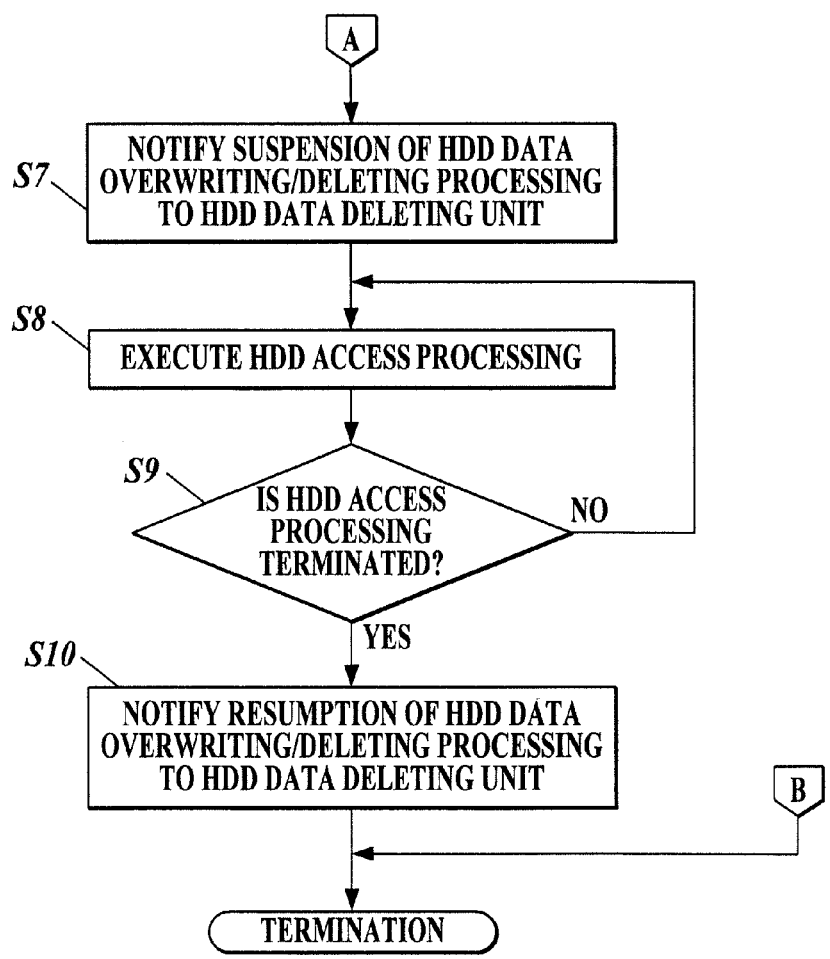

Next, the detailed operations in the processing performed by the control section 11 will be described with reference to FIGS. 10A and 10B. FIGS. 10A and 10B are flow charts showing the processing performed by each of the functional units in the control section 11. Incidentally, it is supposed that there is no data access to the HDD 113 at the start point of the flow charts, and the fact that there is no data access is detected by the HDD data deleting control unit 46.

First, the HDD data deleting control unit 46 judges whether the data to be deleted exists in the HDD 113 or not (step S1). When the HDD data deleting control unit 46 judges that the data to be deleted does not exist in the HDD 113 (step S1; No), the HDD data deleting control unit 46 terminates the processing. Further, when the HDD data deleting control unit 46 judges that the data to be deleted exists in the HDD 113 (step S1; Yes), the HDD data deleting control unit 46 outputs the execution instruction of the HDD data overwriting/deleting processing to the HDD data deleting unit 47, so as to instruct the HDD data deleting unit 47 to start the HDD data overwriting/deleting processing (step S2).

Subsequently, the data parsing unit 41 receives job data transmitted from an external device such as a host computer, and the like, to parse the received job data (step S3). Subsequently, the data parsing unit 41 judges whether a command to access the HDD 113 (an HDD access command) is included in the job data or not, that is to say, whether the job data is job data which accesses the HDD 113 or not (step S4).

When the data parsing unit 41 judges that the HDD access command is not included in the job data (step S4; No), the control section 11 executes the job based on the received job data in each of the functional sections, so as to complete the job.

When the data parsing unit 41 judges that the HDD access command is included in the job data (step S4; Yes), the data parsing unit 41 judges which of the functional unit is the HDD access command instructed to (step S5, step S11, and step S13).

When the data parsing unit 41 judges that the HDD access command is a command instructed to the data parsing unit 41, that is to say, when the data parsing unit 41 judges that an HDD access is to be generated in the data parsing unit 41 (step S5; Yes), the data parsing unit 41 outputs a signal of the HDD access execution state notification (the access start) to the HDD data deleting control unit 46, when the data parsing unit 41 starts the execution of the HDD access processing based on the HDD access command, in the job for the data parsing unit 41 (step S6).

When the signal of the HDD access execution state notification (the access start) is input from the data parsing unit 41, the HDD data deleting control unit 46 outputs the suspension instruction of the HDD data overwriting/deleting processing to the HDD data deleting unit 47, so as to instruct the HDD data deleting unit 47 to suspend the HDD data overwriting/deleting processing (step S7).

Subsequently, the data parsing unit 41 executes the HDD access processing based on the HDD access command (step S8). Subsequently, when the data parsing unit 41 terminates the execution of the HDD access processing (step S9; Yes), the data parsing unit 41 outputs a signal of the HDD access execution state notification (the access termination) to the HDD data deleting control unit 46.

When the signal of the HDD access execution state notification (the access termination) is input from the data parsing unit 41, the HDD data deleting control unit 46 outputs the execution instruction of the HDD data overwriting/deleting processing to the HDD data deleting unit 47, so as to instruct the HDD data deleting unit 47 to resume the HDD data overwriting/deleting processing (step S10). Subsequently, the data parsing unit 41 complete the job, and the functional units other than the data parsing unit 41 in the control section 11 also complete the job.

On the other hand, when the data parsing unit 41 judges that the HDD access command is a command instructed to the data rendering unit 42, that is to say, when the data parsing unit 41 judges that the HDD access is to be generated in the data rendering unit 42 (step S55; No, step S11; Yes), the data rendering unit 42 outputs a signal of the HDD access execution state notification (the access start) to the HDD data deleting control unit 46, when the data rendering unit 42 starts the execution of the HDD access processing based on the HDD access command, in the job for the data rendering unit 42 (step S12).

When the signal of the HDD access execution state notification (the access start) is input from the data rendering unit 42, the HDD data deleting control unit 46 outputs the suspension instruction of the HDD data overwriting/deleting processing to the HDD data deleting unit 47, so as to instruct the HDD data deleting unit 47 to suspend the HDD data overwriting/deleting processing (step S7).

Subsequently, the data rendering unit 42 executes the HDD access processing based on the HDD access command (step S8). Subsequently, when the data rendering unit 42 terminates the execution of the HDD access processing (step S9; Yes), the data rendering unit 42 outputs a signal of the HDD access execution state notification (the access termination) to the HDD data deleting control unit 46.

When the signal of the HDD access execution state notification (the access termination) is input from the data rendering unit 42, the HDD data deleting control unit 46 outputs the execution instruction of the HDD data overwriting/deleting processing to the HDD data deleting unit 47, so as to instruct the HDD data deleting unit 47 to resume the HDD data overwriting/deleting processing (step S10). Subsequently, the data rendering unit 42 completes the job, and the functional units other than the data rendering unit 42 in the control section 11 also complete the job.

On the other hand, when the data parsing unit 41 judges that the HDD access command is a command instructed to the print control unit 43, that is to say, when the data parsing unit 41 judges that the HDD access is to be generated in the print control unit 43 (step S5; No, step S11; No, step S13; Yes), the print control unit 43 outputs a signal of the HDD access execution state notification (the access start) to the HDD data deleting control unit 46, when the print control unit 43 starts the execution of the HDD access processing based on the HDD access command, in the job for the print control unit 43 (step S14).

When the signal of the HDD access execution state notification (the access start) is input from the print control unit 43, the HDD data deleting control unit 46 outputs the suspension instruction of the HDD data overwriting/deleting processing to the HDD data deleting unit 47, so as to instruct the HDD data deleting unit 47 to suspend the HDD data overwriting/deleting processing (step S7).

Subsequently, the print control unit 43 executes the HDD access processing based on the HDD access command (step S8). Subsequently, when the print control unit 43 terminates the execution of the HDD access processing (step S9; Yes), the print control unit 43 outputs a signal of the HDD access execution state notification (the access termination) to the HDD data deleting control unit 46.

When the signal of the HDD access execution state notification (the access termination) is input from the print control unit 43, the HDD data deleting control unit 46 outputs the execution instruction of the HDD data overwriting/deleting processing to the HDD data deleting unit 47, so as to instruct the HDD data deleting unit 47 to resume the HDD data overwriting/deleting processing (step S10). Subsequently, the print control unit 43 completes the job, and the functional units other than the print control unit 43 in the control section 11 also complete the job.

On the other hand, when the data parsing unit 41 judges that the HDD access command is not a command instructed to either one of the functional units (step S5; No, step S11; No, step S13; No), the control section 11 executes the job based on the received job data in each of the functional sections, and completes the job.

As described above, according to the first embodiment, the HDD data deleting control unit 46 detects the existence and the nonexistence of the data access to the HDD 113, based on the HDD access execution state notification output from any one of the data parsing unit 41, the data rendering unit 42, and the print control unit 43. Further, the HDD data deleting control unit 46 refers to the data management information d48 stored in the HDD 113 to detect whether the data to be deleted (the unnecessary data) which is to be the object of the HDD data overwriting/deleting processing is stored in the HDD 113 or not. Subsequently, the HDD data deleting control unit 46 instructs the HDD data deleting unit 47 to execute the HDD data overwriting/deleting processing only in the case in which the data access to the HDD 113 does not exist, and in which the data to be deleted is stored in the HDD 113.

Therefore, a user is not required to set the execution conditions of the overwriting/deleting (the HDD data overwriting/deleting processing), and the image forming apparatus 10 is convenient for the user. In addition, the overwriting/deleting is performed automatically in the image forming apparatus 10 even during the execution of a job, while a storage section (the HDD 113) is not subjected to the data access. Accordingly, the overwriting/deleting of unnecessary data can be performed with efficiency.

[Second Embodiment]

Hereinbelow, a second embodiment of an information processing apparatus according to the present invention is described with reference to the drawings. Incidentally, the differences from the first embodiment are mainly explained in the following description.

[Apparatus Configuration of the Information Processing Apparatus]

FIG. 11 shows an apparatus configuration of an information processing apparatus 30. As shown in FIG. 11, the information processing apparatus 30 comprises a control section 31, a display section 32, and the like.

The display section 32 comprises a liquid crystal display (LCD), and displays an input instruction from an operation section (not shown), data, and the like, according to an instruction of a display signal input from the control section 31.

The control section 31 controls each of the functional sections such as the display section 32, and the like. The control section 31 is connected to the display section 32 through a bus, and is connected to an external apparatus 70 through the bus, a communication section (not shown), and the like, so as to be capable of communication. Further, the control section 31 comprises a CPU 311, a RAM 312, an HDD 313, and a ROM 314, each of which is connected to each other through the bus so as to be capable of communication.

The CPU 311 reads out various processing programs stored in the ROM 314, expands the read programs in a work area and the like formed in the RAM 312, and performs various processing in cooperation with the expanded programs. For example, the CPU 311 integrally manages and controls the information processing apparatus 30 by performing the control of operations of each of the functional sections, the control of input and output of data to and from each of the functional sections, and the like. Here, each of the functional sections is referred to specifically as the display section 32, the operation section, and the like.

The RAM 312 is a section to temporarily store various data input from the communication section, and the like. The stored data is processed by the CPU 311, and is transferred to the HDD 113 and the display section 32 as necessary.

The HDD 313 is a storage section to store various data. Further, the HDD 313 stores data management information d66 including information indicating whether various data stored in the HDD 313 is valid or invalid. The data management information d66 is updated by the CPU 311.

The ROM 314 stores programs so that the CPU 311 can control each of the functional units, information pertaining to processing functions of the information processing apparatus 30, and the like, which are read out by the CPU 311 as necessary so as to be subjected to execution processing in the RAM 312. To put it concretely, the ROM 314 stores a data parsing program d61, a data display control program d62, an HDD access program d63, an HDD data deleting control program d64, an HDD data deleting program d65, and the like.

The CPU 311 reads out the data parsing program d61 in the RAM 312 so as to function as a data parsing unit 61 in cooperation with the data parsing program d61. Further, the CPU 311 reads out the data display control program d62 in the RAM 312 so as to function as a data display control unit 62 in cooperation with the data display control program d62. Further, the CPU 311 reads out the HDD access program d63 in the RAM 312 so as to function as an HDD access unit 63 in cooperation with the HDD access program d63. Further, the CPU 311 reads out the HDD data deleting control program d64 in the RAM 312 so as to function as an HDD data deleting control unit 64 in cooperation with the HDD data deleting control program d64. Further, the CPU 311 reads out the HDD data deleting program d65 in the RAM 312 so as to function as an HDD data deleting unit 65 in cooperation with the HDD data deleting program d65.

Here, the data parsing unit 61 parses job data when the job data is received from an external apparatus 70 through the communication section. Subsequently, the data parsing unit 61 stores the job data in the HDD 313, and outputs data based on the job data to the data display control unit 62, based on the results of the parsing.

The data display control unit 62 outputs the display signal and display data to the display section 32, based on the data output from the data parsing unit 61, and the like.

[Functional Configuration of the Information Processing Apparatus]

Figure 12:
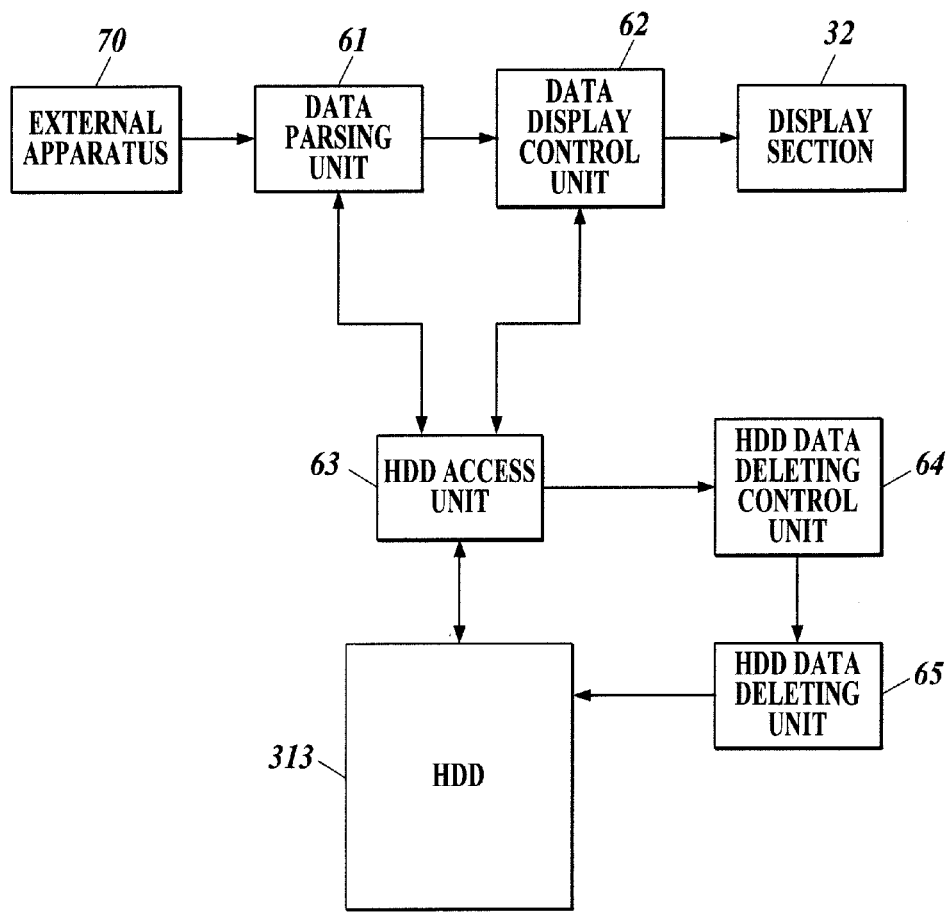
FIG. 12 is a functional configuration diagram of the information processing apparatus.

FIG. 12 shows a functional configuration of the information processing apparatus 30.

As shown in FIG. 12, the data parsing unit 61 receives job data from the external apparatus 70, through the communication section which is not shown. Further, the data parsing unit 61 outputs data based on the job data to the data display control unit 62. Further, the data display control unit 62 outputs data based on the job data to the display section 32.

For example, when the data parsing unit 61 receives a data display job which is one kind of job data from the external apparatus 70 through the communication section, the data parsing unit 61 parses the data display job to output display data included in the data display job to the data display control unit 62. Subsequently, the data display control unit 62 outputs the display data to the display section 32.

Further, a data access from each of the functional units to the HDD 313 is performed through the HDD access unit 63. To put it concretely, the data parsing unit 61 and the data display control unit 62 perform the data access to the HDD 313 through the HDD access unit 63.

[Detailed Operation of the Information Processing Apparatus]

Figure 13A:
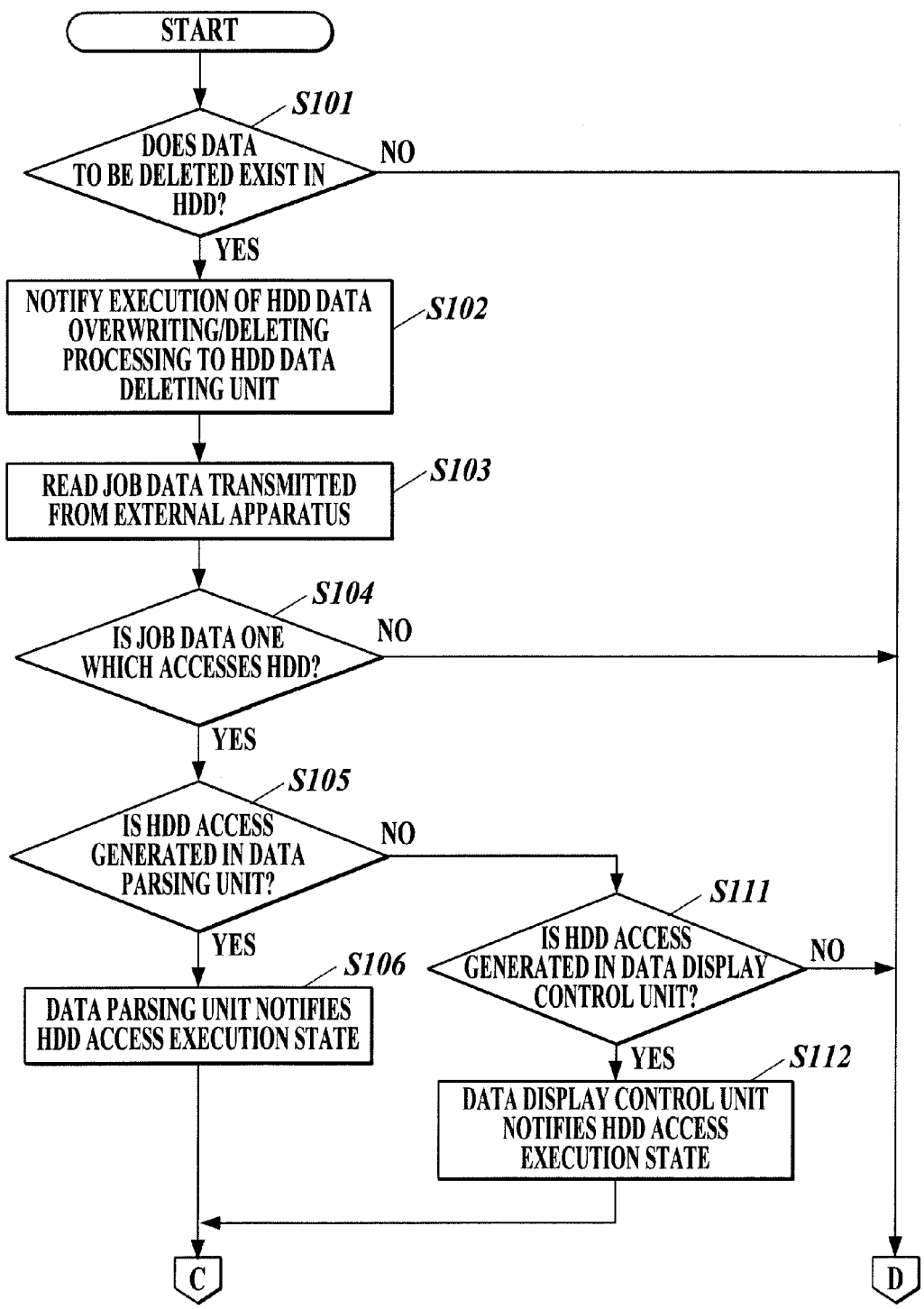
FIGS. 13A and 13B are flow charts showing processing executed in the information processing apparatus.
Figure 13B:
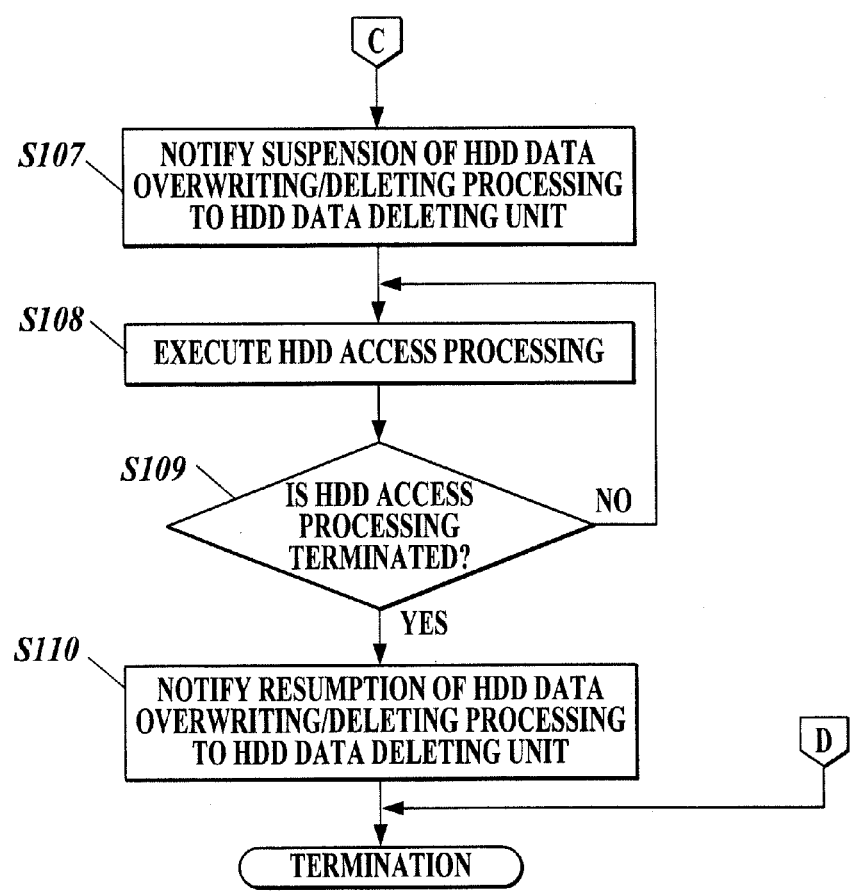

Next, the detailed operations in the processing performed by the control section 31 will be described with reference to FIGS. 13A and 13B. FIGS. 13A and 13B are flow charts showing the processing performed by each of the functional units in the control section 31. Incidentally, it is supposed that there is no data access to the HDD 313 at the start point of the flow charts, and the fact that there is no data access is detected by the HDD data deleting control unit 64.

First, the HDD data deleting control unit 64 judges whether the data to be deleted exists in the HDD 313 or not (step S101). When the HDD data deleting control unit 64 judges that the data to be deleted does not exist in the HDD 313 (step S101; No), the HDD data deleting control unit 64 terminates the processing. Further, when the HDD data deleting control unit 64 judges that the data to be deleted exists in the HDD 313 (step S101; Yes), the HDD data deleting control unit 64 outputs the execution instruction of the HDD data overwriting/deleting processing to the HDD data deleting unit 65, so as to instruct the HDD data deleting unit 65 to start the HDD data overwriting/deleting processing (step S102).

Subsequently, the data parsing unit 61 receives job data transmitted from the external apparatus 70, to parse the received job data (step S103). Subsequently, the data parsing unit 61 judges whether a command to access the HDD 313 (an HDD access command) is included in the job data or not, that is to say, whether the job data is job data which accesses the HDD 313 or not (step S104).

When the data parsing unit 61 judges that the HDD access command is not included in the job data (step S104; No), the control section 31 executes the job based on the received job data in each of the functional sections, so as to complete the job.

When the data parsing unit 61 judges that the HDD access command is included in the job data (step S104; Yes), the data parsing unit 61 judges which of the functional unit is the HDD access command instructed to (step S105 and step S111).

When the data parsing unit 61 judges that the HDD access command is a command instructed to the data parsing unit 61, that is to say, when the data parsing unit 61 judges that an HDD access is to be generated in the data parsing unit 61 (step S105; Yes), the data parsing unit 61 outputs a signal of the HDD access execution state notification (the access start) to the HDD data deleting control unit 64, when the data parsing unit 61 starts the execution of the HDD access processing based on the HDD access command, in the job for the data parsing unit 61 (step S106).

When the signal of the HDD access execution state notification (the access start) is input from the data parsing unit 61, the HDD data deleting control unit 64 outputs the suspension instruction of the HDD data overwriting/deleting processing to the HDD data deleting unit 65, so as to instruct the HDD data deleting unit 65 to suspend the HDD data overwriting/deleting processing (step S107).

Subsequently, the data parsing unit 61 executes the HDD access processing based on the HDD access command (step S108). Subsequently, when the data parsing unit 61 terminates the execution of the HDD access processing (step S109; Yes), the data parsing unit 61 outputs a signal of the HDD access execution state notification (the access termination) to the HDD data deleting control unit 64.

When the signal of the HDD access execution state notification (the access termination) is input from the data parsing unit 61, the HDD data deleting control unit 64 outputs the execution instruction of the HDD data overwriting/deleting processing to the HDD data deleting unit 65, so as to instruct the HDD data deleting unit 65 to resume the HDD data overwriting/deleting processing (step S110). Subsequently, the data parsing unit 61 completes the job, and the functional units other than the data parsing unit 61 in the control section 31 also complete the job.

On the other hand, when the data parsing unit 61 judges that the HDD access command is a command instructed to the data display control unit 62, that is to say, when the data parsing unit 61 judges that the HDD access is to be generated in the data display control unit 62 (step S105; No, step S111; Yes), the data display control unit 62 outputs a signal of the HDD access execution state notification (the access start) to the HDD data deleting control unit 64, when the data display control unit 62 starts the execution of the HDD access processing based on the HDD access command, in the job for the data display control unit 62 (step S112).

When the signal of the HDD access execution state notification (the access start) is input from the data display control unit 62, the HDD data deleting control unit 64 outputs the suspension instruction of the HDD data overwriting/deleting processing to the HDD data deleting unit 65, so as to instruct the HDD data deleting unit 65 to suspend the HDD data overwriting/deleting processing (step S107).

Subsequently, the data display control unit 62 executes the HDD access processing based on the HDD access command (step S108). Subsequently, when the data display control unit 62 terminates the execution of the HDD access processing (step S109; Yes), the data display control unit 62 outputs a signal of the HDD access execution state notification (the access termination) to the HDD data deleting control unit 64.

When the signal of the HDD access execution state notification (the access termination) is input from the data display control unit 62, the HDD data deleting control unit 64 outputs the execution instruction of the HDD data overwriting/deleting processing to the HDD data deleting unit 65, so as to instruct the HDD data deleting unit 65 to resume the HDD data overwriting/deleting processing (step S110). Subsequently, the data display control unit 62 completes the job, and the functional units other than the data display control unit 62 in the control section 31 also complete the job.

On the other hand, when the data parsing unit 61 judges that the HDD access command is not a command instructed to either one of the functional units (step S105; No, step S111; No), the control section 31 executes the job based on the received job data in each of the functional sections, and completes the job.

As described above, according to the second embodiment, the HDD data deleting control unit 64 detects the existence and the nonexistence of the data access to the HDD 313, based on the HDD access execution state notification output from the data parsing unit 61 or the data display control unit 62. Further, the HDD data deleting control unit 64 refers to the data management information d66 stored in the HDD 313 to detect whether the data to be deleted (the unnecessary data) which is to be the object of the HDD data overwriting/deleting processing is stored in the HDD 313 or not. Subsequently, the HDD data deleting control unit 64 instructs the HDD data deleting unit 65 to execute the HDD data overwriting/deleting processing only in the case in which the data access to the HDD 313 does not exist, and in which the data to be deleted is stored in the HDD 313.

Therefore, a user is not required to set the execution conditions of the overwriting/deleting (the HDD data overwriting/deleting processing), and the information processing apparatus 30 is convenient for the user. In addition, the overwriting/deleting is performed automatically in the information processing apparatus 30 even during the execution of a job, while a storage section (the HDD 313) is not subjected to the data access. Accordingly, the overwriting/deleting of unnecessary data can be performed with efficiency.

Incidentally, the descriptions given for each of the above embodiments are an example of the information processing apparatus according to the present invention, and the present invention is not limited to them. The detailed configurations and the detailed operations of each of the functional sections comprised by the information processing apparatus can also be suitably modified.

Further, in the above described embodiments, an example in which the ROM and the HDD are applied as a computer-readable medium which stores programs. As the other computer-readable media, a nonvolatile memory, such as a flash memory, and a portable recording media, such as a compact disc read only memory (CD-ROM), and the like, can be applied. Moreover, as a medium to provide the data of a program through a communication line, a carrier wave may also be applied.

The present U.S. patent application claims a priority under the Paris Convention of Japanese patent application No. 2008-159011 filed on Jun. 18, 2008, which shall be a basis of correction of an incorrect translation.

What is claimed is:

1. A image forming apparatus comprising:
a storage section which stores data;
a data parsing unit which obtains print data and parses the obtained print data;
a data rendering unit which generates rendering data based on a parsing result by the data parsing unit;
an image forming control unit which controls an image forming processing of forming an image based on the rendering data generated by the data rendering unit,
wherein at least one of the data parsing unit, the data rendering unit, and the image forming control unit executes a data access to the storage section, and
wherein the image forming apparatus further comprises:
a control section which
(i) detects whether the data access to the storage section by any one of the data parsing unit, the data rendering unit, and the image forming control unit exists,
(ii) detects whether unnecessary data exists in the storage section, and
(iii) overwrites or deletes the unnecessary data, when the data access to the storage section by any one of the data parsing unit, the data rendering unit, and the image forming control unit does not exist and when the unnecessary data exists.

2. The image forming apparatus of claim 1, wherein
the control section manages information pertaining to whether the data stored in the storage section is valid or invalid, and
the unnecessary data is data to be deleted or overwritten, the unnecessary data being invalidated by the control section.

3. The image forming apparatus of claim 2, wherein
the control section determines whether the data stored in the storage section is valid or invalid based on data management information stored in the storage section.

4. The image forming apparatus of claim 1, wherein
when the data access to the storage section by any one of the data parsing unit, the data rendering unit, and the image forming control unit is requested while the unnecessary data is being subjected to an overwriting or deleting processing, the control section suspends the overwriting or deleting processing, and when the data access is terminated while the overwriting or deleting processing is being suspended, the control section resumes the overwriting or deleting processing.

5. A nontransitory computer-readable storage medium encoded with a computer program, which when executed by a computer, causes the computer to perform a process comprising:
storing data in a storage section;
obtaining, by a data parsing unit, print data;
parsing by the data parsing unit the obtained printing data;
generating, by a data rendering unit, rendering data based on a result of parsing the obtained printing data;
controlling, by an image forming control unit, an image forming processing of forming an image based on the rendering data;
detecting, by a control section, whether a data access to the storage section by any one of the data parsing unit, the data rendering unit, and the image forming control unit exists;
detecting, by the control section, whether unnecessary data exists in the storage section, and
overwriting or deleting, by the control section, the unnecessary data, when the data access to the storage section by any one of the data parsing unit, the data rendering unit, and the image forming control unit does not exist and when the unnecessary data exists.

6. The nontransitory computer-readable storage medium of claim 5, wherein the process further comprises:
managing, by the control section, information pertaining to whether the data stored in the storage section is valid or invalid, and
wherein the unnecessary data is data to be deleted, the unnecessary data being invalidated by the control section.

7. The nontransitory computer-readable storage medium of claim 6, wherein the process further comprises:
determining, by the control section, whether the data stored in the storage section is valid or invalid based on data management information stored in the storage section.

8. The nontransitory computer-readable storage medium of claim 5, wherein the process further comprises:
detecting, by the control section, whether the data access to the storage section by at least one functional unit included in the control section exists.

9. A method for controlling an image forming processing, comprising:
storing data in a storage section;
obtaining, by a data parsing unit, print data;
parsing, by the data parsing unit, the obtained printing data;
generating, by a data rendering unit, rendering data based on a result of parsing the obtained printing data;
controlling, by an image forming control unit, an image forming processing of forming an image based on the rendering data;
detecting, by a control section, whether a data access to the storage section by any one of the data parsing unit, the data rendering unit, and the image forming control unit exists;
detecting, by the control section, whether unnecessary data exists in the storage section, and
overwriting or deleting, by the control section, the unnecessary data, when the data access to the storage section by any one of the data parsing unit, the data rendering unit, and the image forming control unit does not exist and when the unnecessary data exists.

10. The method of claim 9, further comprising:
managing, by the control section, information pertaining to whether the data stored in the storage section is valid or invalid, and
wherein the unnecessary data is data to be deleted, the unnecessary data being invalidated by the control section.

11. The method of claim 10, further comprising:
determining, by the control section, whether the data stored in the storage section is valid or invalid based on data management information stored in the storage section.

12. The method of claim 9, further comprising:
detecting, by the control section, whether the data access to the storage section by at least one functional unit included in the control section exists.

* * * * *